United States Patent
Kassakian et al.

(10) Patent No.: US 8,234,170 B2
(45) Date of Patent: Jul. 31, 2012

(54) ONLINE SEARCH ADVERTISING AUCTION BID DETERMINATION TOOLS AND TECHNIQUES

(75) Inventors: Peter Kassakian, South San Francisco, CA (US); Matthew Esch, San Francisco, CA (US)

(73) Assignee: Webtrends, Inc., Portland, OR (US)

( * ) Notice: Subject to any disclaimer, the term of this patent is extended or adjusted under 35 U.S.C. 154(b) by 317 days.

(21) Appl. No.: 12/693,390

(22) Filed: Jan. 25, 2010

(65) Prior Publication Data

US 2010/0198679 A1 Aug. 5, 2010

Related U.S. Application Data (60) Provisional application No. 61/148,860, filed on Jan. 30, 2009.

(51) Int. Cl.
*G06Q 30/00* (2006.01)
(52) U.S. Cl. .................... 705/14.71; 705/14.42
(58) Field of Classification Search ............... 705/14.71, 705/14.42
See application file for complete search history.

(56) References Cited

U.S. PATENT DOCUMENTS

| | | | |
|---|---|---|---|
| 2006/0206479 A1* | 9/2006 | Mason | 707/5 |
| 2006/0206516 A1* | 9/2006 | Mason | 707/102 |
| 2006/0212350 A1 | 9/2006 | Ellis et al. | |
| 2007/0073723 A1 | 3/2007 | Ramer et al. | |
| 2007/0179849 A1 | 8/2007 | Jain | |
| 2008/0301033 A1* | 12/2008 | Singh et al. | 705/37 |
| 2010/0004974 A1* | 1/2010 | Libby et al. | 705/10 |
| 2011/0112893 A1* | 5/2011 | Karlsson et al. | 705/14.4 |

OTHER PUBLICATIONS

VistaPrint FY 2009 Q2 Earnings Live Q&A Conference Call-Final; Fair Disclosure Wire; Anonymous; Jan. 27, 2009.*

* cited by examiner

*Primary Examiner* — John Weiss
*Assistant Examiner* — Michael Stibley
(74) *Attorney, Agent, or Firm* — Marger Johnson & McCollom, P.C.

(57) ABSTRACT

A machine-controlled method can include estimating expected conversion rates for ads by applying an estimated conversion rate statistical model to each ad, estimating an expected AOV for each ad by applying an estimated AOV statistical model to each ad, applying an inference algorithm, and determining auction bids based on the estimated expected conversion rate and the estimated expected AOV for the ads.

17 Claims, 5 Drawing Sheets

ONLINE SEARCH ADVERTISING AUCTION BID DETERMINATION TOOLS AND TECHNIQUES

CROSS-REFERENCE TO RELATED APPLICATIONS

The present application claims the benefit of U.S. Provisional Patent Application No. 61/148,860, filed Jan. 30, 2009, the disclosure of which is hereby incorporated by reference in its entirety herein.

TECHNICAL FIELD

The disclosed technology pertains to online search advertising, and more particularly to determining bids for search auctions.

BACKGROUND

In statistics, it is generally desirable to infer an important quantity from a small dataset. To compute bids that will result in high revenue for a given target return on advertising spending (ROAS), the principle quantities that are generally sought include a conversion rate and an average order value (AOV) for each ad. While current schemes may attempt to estimate these values in calculations, they typically invoke multifaceted penalties for slow or inefficient methods.

Consider an example in which the conversion rate estimate for an ad is too low. In such a case, one would run the risk that the correspondingly low bid would drop the ad out of circulation, thereby stopping data collection. Consider a less extreme situation in which a low bid could lower click traffic on the ad. Such a scenario would result in missed conversions. If a bid is too high for too long, it can result in prolonged and high levels of ad spend on a poorly performing ad.

SUMMARY

Embodiments of the disclosed technology can include systems and methods for estimating a conversion rate and an average order value (AOV) that can result in a reduction in overall cost, including a "cost of learning," faster convergence to higher revenues for a given return on ad spend (ROAS) goal, and better tracking of the ROAS goal. Additionally, implementations of the disclosed technology can allow for the use of a smaller data window size than used by current systems. Thus, embodiments can leverage a fast convergence to provide improved tracking of seasonal effects.

Embodiments of the disclosed technology can include a method for bidding in paid search advertising auctions that combines a crafted statistical model and inferential algorithm that have been designed to address statistical inference problems specific to online paid search advertising bidding. Optimal bids in the auctions, depending on the objective, are functions of particular statistical quantities, i.e., the expected conversion rates of the ads and the expected AOV of the ads.

Embodiments of the disclosed technology can include the combination of statistical models and inferential algorithms that is both statistically tailored to overcome obstacles associated with paid search bidding and computationally efficient enough for use with campaigns consisting of extremely large numbers of ads. The disclosed technology exploits a hypothesis that conversion rates and AOVs among ads associated with particular websites are not statistically independent. Implementations of the disclosed technology can be used to deliver more precise measurements of expected conversion rates and expected AOVs for search ads while requiring minimal click data.

The foregoing and other objects, features and advantages of the invention will become more readily apparent from the following detailed description of a preferred embodiment of the invention that proceeds with reference to the accompanying drawings.

DETAILED DESCRIPTION

Online search auction advertisers generally take advantage of known search engines, e.g., Google, Yahoo!, or Microsoft, to generate business from advertisements displayed by the search engine. For example, an advertiser may have a certain ad that he or she would like to be presented to a search engine user when the user is using the search engine to search for certain things. Advertisers tend to track the impact their ads have on customers or potential customers by observing the number of user visits, e.g., by clicking on the ad, as well as the number of conversions, e.g., situations where the user has purchased something after clicking on the ad or performing some other action that the advertiser considers to be important. Each time a user clicks on an advertiser's ad that was presented to him or her while using a search engine, the advertiser is expected to pay a certain amount to the search engine.

In general, an advertiser must bid a certain amount in order to "win" the right to have the search engine display the advertiser's ad. Online search advertisers generally create entire portfolios of ads and must therefore make many individual auction bids to the search engine. While advertisers do not want to bid too much for certain ads, e.g., because they may lose money if they end up paying more to the search engine than the generate from the ad, they also want to avoid getting outbid by competitors.

Embodiments of the disclosed technology can include the use of one or more statistical models and one or more algorithms to infer statistical quantities based on observed data. Embodiments can also include a combining of information from the statistical models and inferring algorithms for use in determining real-time adjustable bids for paid search advertising auctions. Embodiments can include outputting one or more portfolios of bids for groups or campaigns of search ads that result in efficient allocation of ad spending across the ads. This is beneficial because ads generally have differing average returns in terms of revenue or utility, and are usually unknown to the advertiser prior to data collection. Collecting data generally requires running an ad in a live auction, which costs in both money and time. Thus, embodiments of the disclosed technology can be used to output high-quality bid portfolios using only a small amount of this expensive data.

The challenge of estimating conversion rate and AOV for a single ad in isolation does not provide one with many options. While there may be a general idea of the conversion rate and AOV to form prior distributions, a Bayesian estimate could provide estimates that are at least better than taking historical averages, e.g., over a period measured in clicks or days. Embodiments can improve these estimates by incorporating data from all sources available, such as data sets associated with other ads at a common website, for example.

In certain embodiments, two different parameters can be used to specify a common prior distribution across a group of related ads. Observed data can include click data such as click count, e.g., the number of clicks over a certain period of time, conversion data such as the number of conversions per each click, and/or revenue data for each ad such as the amount of revenue generated per each conversion. One having ordinary skill in the art will appreciate that click data and conversion data are usually discrete values and that the conversion rate can and often does exceed one. For example, if advertisers consider individual page views to be conversions, they may have a high conversion rate if users are viewing multiple pages on the advertiser's website after clicking on the ad.

By knowing the two parameters used to specify the common distribution, one can compute optimal Bayesian estimates for each latent variable. Computing values for the two parameters can maximize the likelihood of observing the data and can also allow for control of the mean and variance of the prior distribution. As observed data is collected, the estimates for the two parameters as well as all of the latent variables can be updated. Thus, each ad can benefit from data collected for another ad in the group.

Implementations of Two Different Statistical Models

Embodiments of the disclosed technology can include two similar statistical models. One statistical model can be used to estimate an expected conversion rate for each ad within a portfolio of ads. This statistical model will be referred to herein as an expected conversion rate statistical model. Another statistical model can be used to estimate the expected average order value (AOV) for each ad. This statistical model will be referred to herein as an expected AOV model. Both statistical models can postulate that latent, e.g., unobserved, random variables can parameterize probability distributions that generate observed click data, conversion data, and revenue data for the ads.

For the case of conversion rate, there is a latent variable $\theta_i$ for each $ad^i$ that represents the conversion rate of the ad, where the set of click data and conversion data is assumed to be observations of random samples from a Poisson distribution with parameter $\theta_i$. These variables $\{\theta_i\}$ are, in turn, assumed to be drawn from a Gamma distribution with common (campaign-level) parameters $\alpha$ and $\beta$. Because the probability distributions in this model depend on campaign-level parameters, the latent variables $\theta_i$ are not independent since one cannot observe $\alpha$ and $\beta$. Because the predictive distribution is Poisson, conversion rates that exceed one are handled gracefully.

The statistical model for average order value is similar. For example, the independence structure is substantially identical to that used for conversion rate. However, the distributions are chosen differently and the observed data is different. The observed data in the AOV model includes conversion events and their associated revenue. Again there are latent parameters $\theta_i$, one for each ad that are linked together via common parameters $\alpha$ and $\beta$.

Implementations of an Inference Algorithm

Certain embodiments can include the implementation of an inference algorithm to determine most likely values for the latent variables given the observed data. These estimates can then be used to predict expected conversion rates and expected AOVs, which can both be ultimately used together to set the auction bids. The inference algorithm can be based upon an expectation-maximization (EM) algorithm with enhancements.

Implementations of the algorithm can be enhanced to make the algorithm more computationally efficient by leveraging the fact that the marginal probability of the data given $\alpha$ and $\beta$ can be computed analytically, as well as the fact that it is not generally necessary to fully maximize the expected complete log likelihood in each M-step. Thus, EM iterations can be very fast and allow the inference algorithm to be applied to groups of extremely large numbers of ads.

Computations Involving Data from the Statistical Models and Inference Algorithm

Certain embodiments can include use of the inferred values for $\alpha$ and $\beta$, as computed in the inferential algorithm for each statistical model, to compute bids for the corresponding paid search auction. For a desired target return on ad spend goal T, the bid for $ad^i$ can be computed using the following equation:

$$b_i = \frac{1}{T}\left(\frac{\beta_{aov} + r_i}{\alpha_{aov} - 1 + x_i}\right)\left(\frac{\alpha_{cvr} + x_i}{\beta_{cvr} + n_i}\right), \quad (1)$$

where $n_i$ refers to the total number of observed clicks, $x_i$ refers to the total number of observed conversions, and $r_i$ refers to the total observed revenue associated with ad i. The statistical models and algorithm for inference can provide estimates of average order value and conversion rate for each ad.

Illustrated Embodiments

Figure 1:
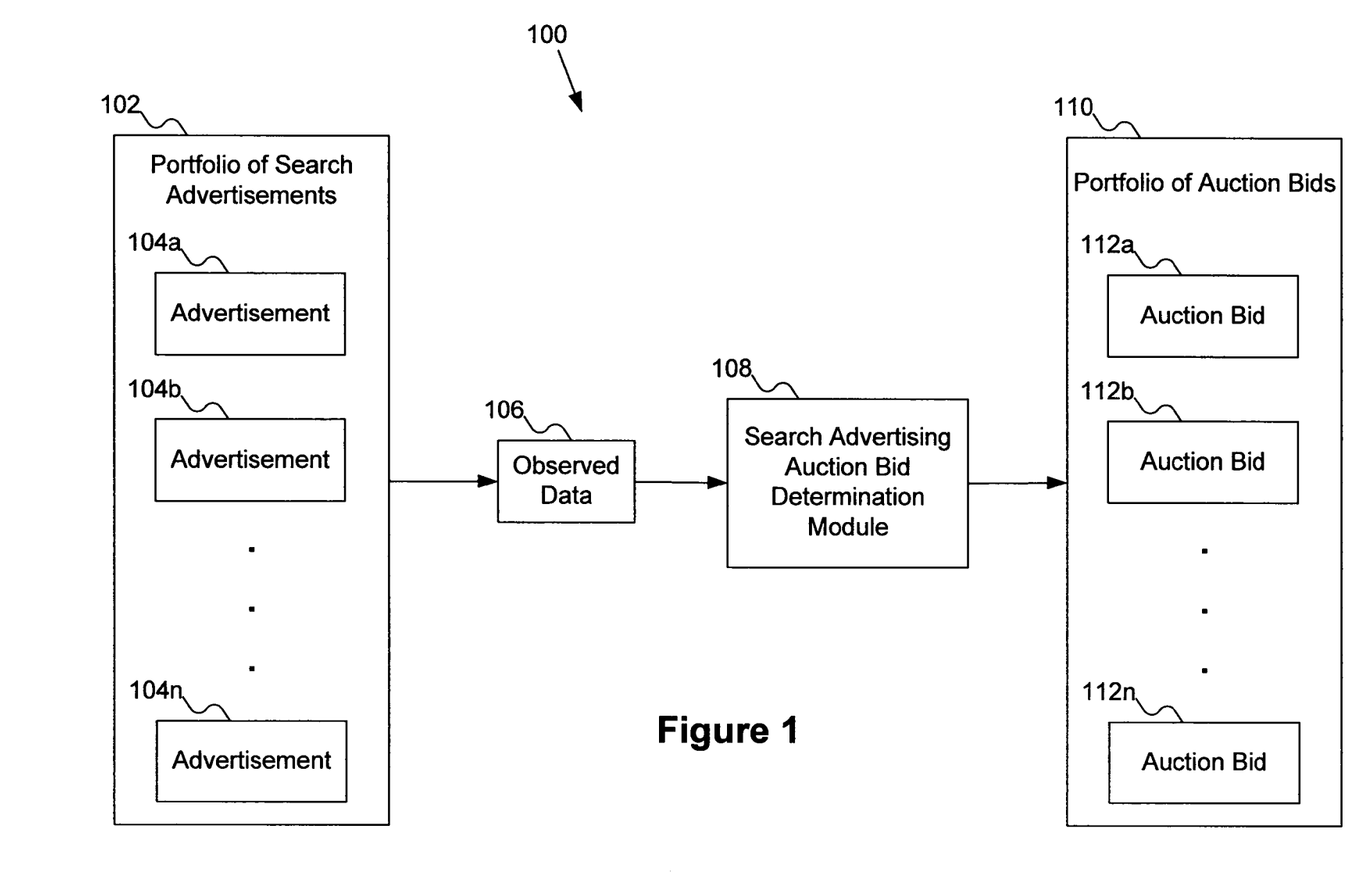
FIG. 1 is a block diagram that illustrates an example of an online search advertising environment in which embodiments of the disclosed technology can be implemented.

FIG. 1 is a block diagram that illustrates an example of an online search advertising environment 100 in which embodiments of the disclosed technology can be implemented. The environment 100 includes a portfolio 102 of search advertisements 104a-104n. Observed data 106 can include click data, e.g., the number of clicks on the corresponding ad over a certain period of time, conversion data, e.g., the number of conversion events associated with the corresponding ad, and revenue data such as the amount of revenue from conversions.

In the example, a search advertising auction bid determination module 108 can receive the observed data 106 and use it to compute a portfolio 110 of auction bids 112a-112n. In certain embodiments, the search advertising auction bid determination module 108 can determine an auction bid for each of the search advertisements 104a-104n. In other embodiments, the search advertising auction bid determination module 108 determines fewer auction bids than search advertisements. For example, one of the auction bids 112a-112n can correspond to more than one of the search advertisements 104a-104n.

Figure 2:
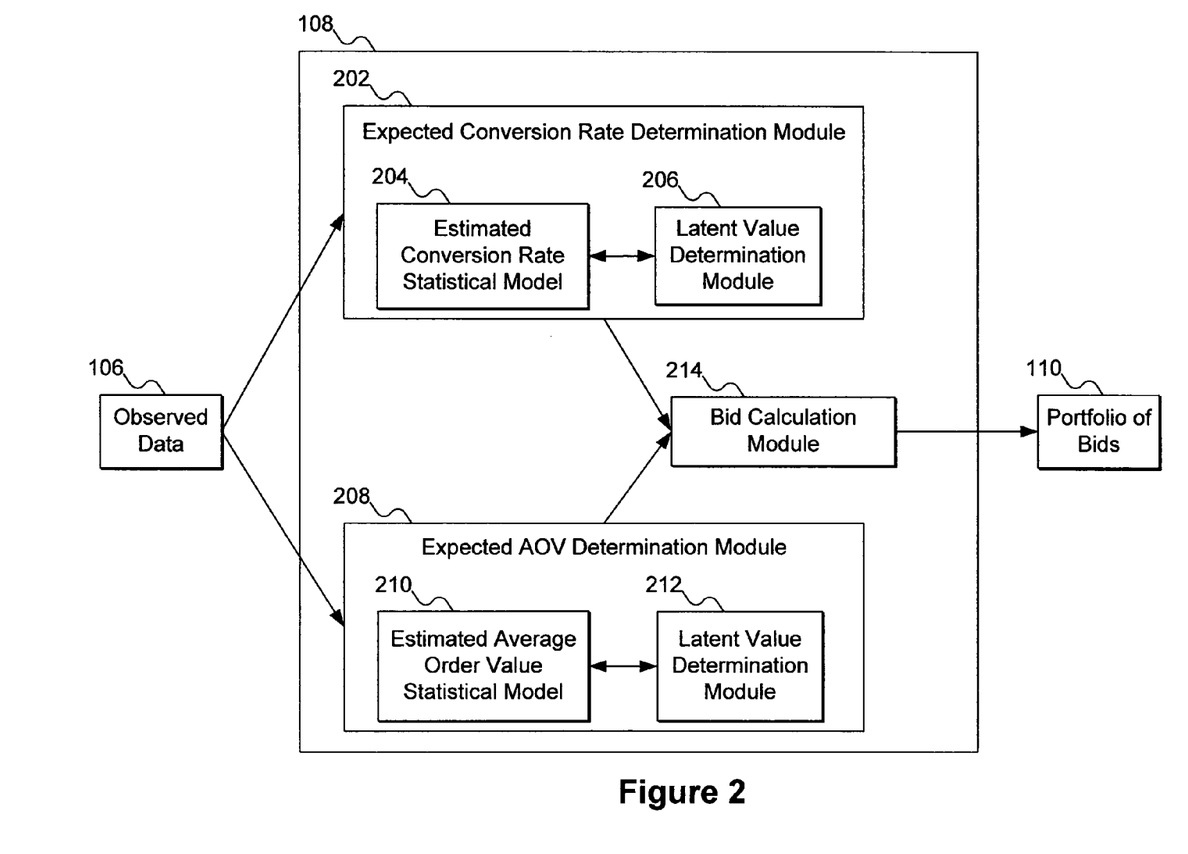
FIG. 2 is a block diagram that illustrates an example of a search advertising auction bid determination module in accordance with embodiments of the disclosed technology.

FIG. 2 is a block diagram that illustrates an example of the search advertising auction bid determination module 108 of FIG. 1. In the example, the search advertising auction bid determination module 108 includes an expected conversion rate determination module 202 and an expected average order value (AOV) determination module 208.

In the example, the expected conversion rate determination module 202 includes an estimated conversion rate statistical model 204 that can be applied to the observed data 106 corresponding to the search ads. The expected conversion rate determination module 202 also includes a first latent value determination module 206 that can include an implementation of an inference algorithm to be used in connection with the estimated conversion rate statistical model 204 to determine conversion rates for each of the search ads.

In the example, the expected AOV determination module 208 includes an estimated AOV statistical model 210 that can be applied to the observed data 106 corresponding to the search ads. The expected AOV determination module 202 also includes a second latent value determination module 206 that can include an implementation of an inference algorithm to be used in connection with the estimated AOV statistical model 204 to determine AOVs for each of the search ads.

The search advertising auction bid determination module 108 as illustrated in FIG. 2 also includes an auction bid calculation module 214 that can determine and provide as output each auction bid within the portfolio 110 of auction bids based on information received from the conversion rate determination module 202, e.g., expected conversion rate of the search ads, and from the AOV determination module 208, e.g., expected AOV of the ads.

Figure 3:
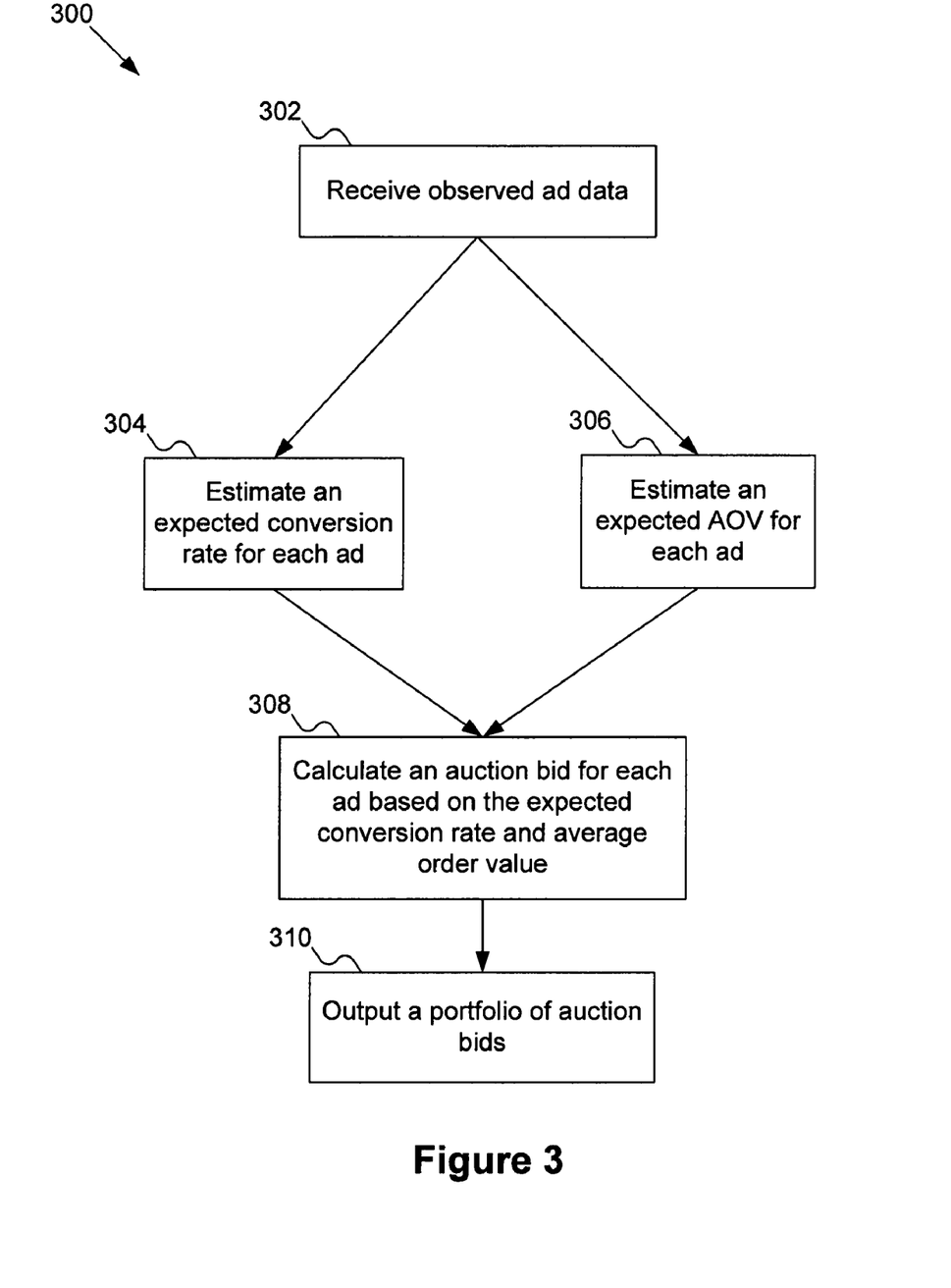
FIG. 3 is a flowchart that illustrates an example of a machine-controlled method of determining search advertising auction bids in accordance with embodiments of the disclosed technology.

FIG. 3 is a flowchart that illustrates an example of a machine-controlled method 300 of determining search advertising auction bids in accordance with embodiments of the disclosed technology. At 302, observed ad data is received. At 304, an expected conversion rate is estimated for each ad in the group of ads in accordance with techniques described herein. At 306, an expected AOV is estimated for each ad in the group of ads in accordance with techniques described herein. In certain embodiments, the estimates at 304 and 306 are calculated substantially simultaneously.

At 308, auction bids are calculated for search ads based on the expected conversion rate estimated at 304 and the expected AOV estimated at 306. In certain embodiments, an auction bid can be calculated for each search ad within a search ad portfolio. Alternatively, auction bids can be calculated for less than all of the search ads in the portfolio. Once the auctions bids have been calculated, they can be outputted as a portfolio of auction bids as shown at 310.

Figure 4:
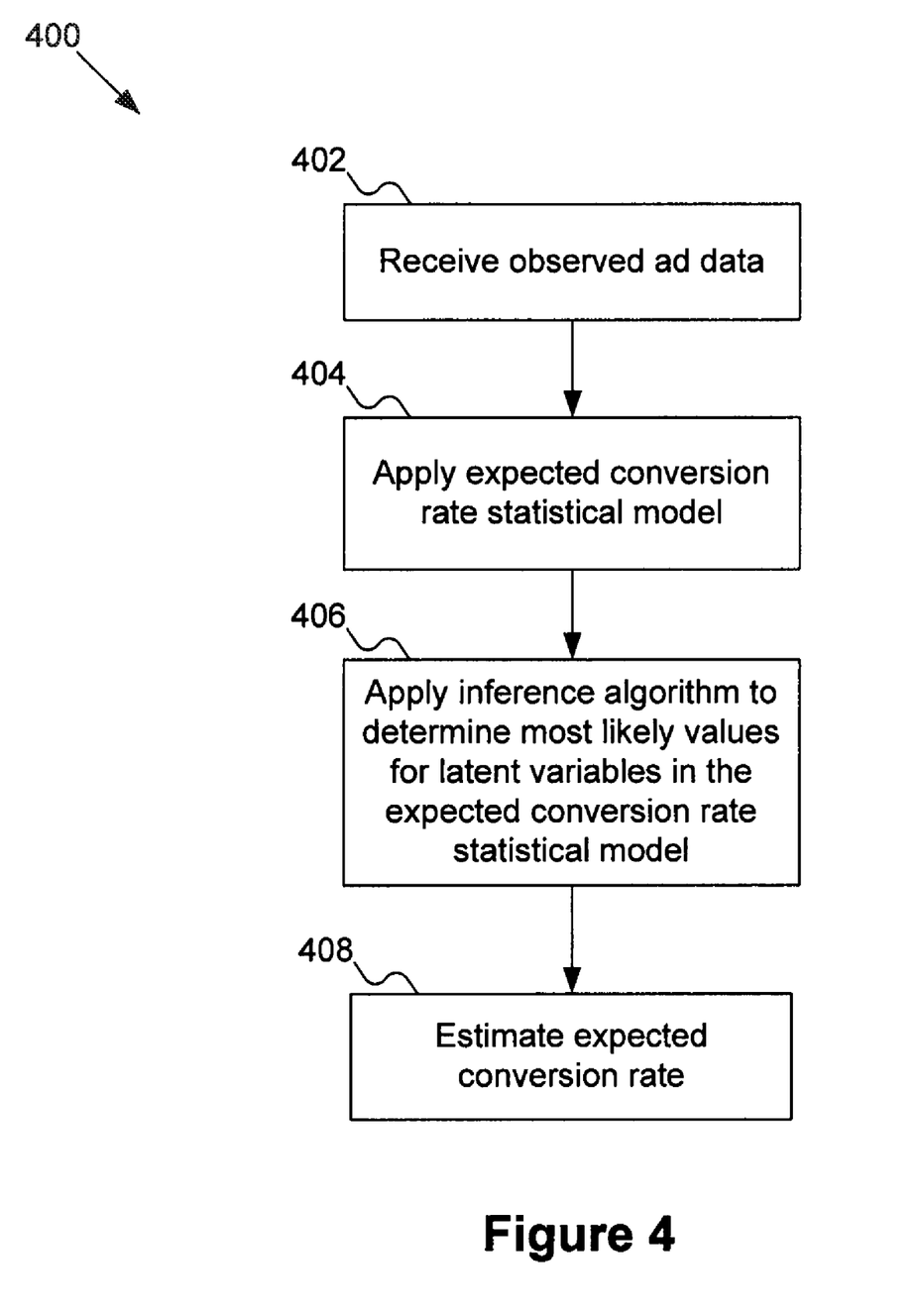
FIG. 4 is a flowchart that illustrates an example of a machine-controlled method of determining expected conversion rates for search ads in accordance with embodiments of the disclosed technology.

FIG. 4 is a flowchart that illustrates an example of a machine-controlled method 400 of determining expected conversion rates for search ads in accordance with embodiments of the disclosed technology. At 402, observed ad data is received. At 404, an expected conversion rate statistical model is applied to provide an initial estimate of a conversion rate for each of the search ads in the group.

At 406, an inference algorithm is applied to the expected conversion rate statistical model applied at 404 to determine most likely values for certain latent variables in the expected conversion rate statistical model. Determining most likely values for the latent variables allows for a refined estimation of the expected conversion rate for the ads, as shown at 408.

Figure 5:
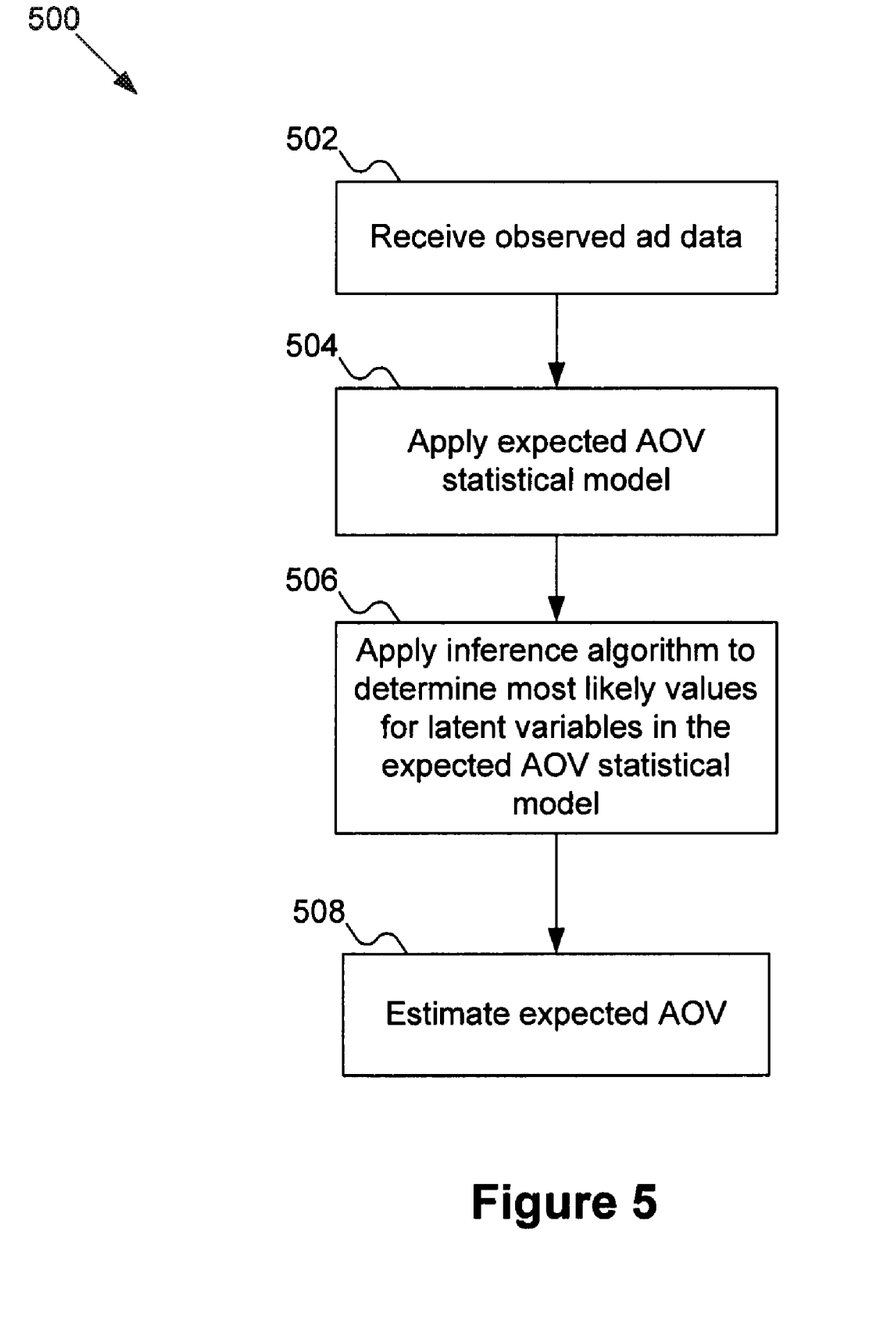
FIG. 5 is a flowchart that illustrates an example of a machine-controlled method of determining expected average order values (AOVs) for search ads in accordance with embodiments of the disclosed technology.

FIG. 5 is a flowchart that illustrates an example of a machine-controlled method 500 of determining expected average order values (AOVs) for search ads in accordance with embodiments of the disclosed technology. At 502, observed ad data is received. At 504, an expected AOV statistical model is applied to provide an initial estimate of an AOV for each of the search ads in the group.

At 506, an inference algorithm is applied to the expected AOV statistical model applied at 504 to determine most likely values for certain latent variables in the expected AOV statistical model. Determining most likely values for the latent variables in the statistical model allows for a refined estimation of the expected AOV for the ads, as shown at 508.

The aggregation of observed data across all search ads in a portfolio, rather than focusing on a single ad, can provide for more efficient estimations. For example, aggregating across all ads requires significantly less observation time than focusing on a single ad. Also, the sharing of observed information for one ad in a group in a statistical way with the other ads in the group can enable the leveraging of information coming back in a unified way so that all of the bids in the corresponding portfolio of bids can be predicted as accurately as possible.

Implementations of the disclosed technology can arrive at high-quality bids faster, thereby spending less money on data collection, than current systems. Because of the modeling decisions specific to the disclosed technology, auction bids on groups of search ads can rise and fall in a correlated manner, particularly when only limited quantities of data have been accumulated for any one ad. Current systems do not adequately address this challenge of setting bids for search advertising auctions when only limited quantities of data are available for any one ad.

Embodiments of the disclosed technology can address four particular areas of difficulty, among others, that are generally encountered in automatic paid search bidding. For example, it costs money to gather statistical data. In general, the more data that is available, the better the bidding decisions can be. Because gathering the data, e.g., in the form of click traffic, costs money, implementations of the disclosed technology can achieve significant overall savings by providing high-quality bidding decisions using only a small dataset.

Embodiments can also enhance predictive accuracy of estimates by leveraging statistical strength from all of the ads in a group as a whole, thereby resulting in better bidding. Embodiments can also provide for natural handling of conversion rates that exceed one. Current methods of estimation cannot gracefully handle such cases, which tend to be common for certain types of advertising, e.g., where a user converts many more times than he or she clicks on the ad.

Embodiments can also provide for efficient tracking of seasonally changing statistics. Because only a modest amount of data is needed to compute high-quality estimates and bids, it is not necessary to collect data over a long period of time. Thus, in certain implementations, only the most recent data is used. This can result in accurate tracking of temporally changing statistics, which are commonly encountered in search advertising environments.

Furthermore, because embodiments can enhance the predictive accuracy as discussed above, the ad campaigns can track revenue to ROAS constraints with more precision. This, in turn, can provide for a number of additional functionalities such as an ability to accurately measure changes in click traffic for varying levels of ad spend, e.g., as controlled through an ROAS constraint. Because embodiments of the disclosed technology can convert optimization constraints into control parameters, each embodiment can essentially serve as a building block for a wide variety of other functionalities.

General Description of a Suitable Machine in Which Embodiments of the Disclosed Technology can be Implemented The following discussion is intended to provide a brief, general description of a suitable machine in which embodiments of the disclosed technology can be implemented. As used herein, the term "machine" is intended to broadly encompass a single machine or a system of communicatively coupled machines or devices operating together. Exemplary machines can include computing devices such as personal computers, workstations, servers, portable computers, handheld devices, tablet devices, and the like.

Typically, a machine includes a system bus to which processors, memory (e.g., random access memory (RAM), read-only memory (ROM), and other state-preserving medium), storage devices, a video interface, and input/output interface ports can be attached. The machine can also include embedded controllers such as programmable or non-programmable logic devices or arrays, Application Specific Integrated Circuits, embedded computers, smart cards, and the like. The machine can be controlled, at least in part, by input from conventional input devices (e.g., keyboards and mice), as well as by directives received from another machine, interaction with a virtual reality (VR) environment, biometric feedback, or other input signal.

The machine can utilize one or more connections to one or more remote machines, such as through a network interface, modem, or other communicative coupling. Machines can be interconnected by way of a physical and/or logical network, such as an intranet, the Internet, local area networks, wide area networks, etc. One having ordinary skill in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

Embodiments of the disclosed technology can be described by reference to or in conjunction with associated data including functions, procedures, data structures, application programs, instructions, etc. that, when accessed by a machine, can result in the machine performing tasks or defining abstract data types or low-level hardware contexts. Associated data can be stored in, for example, volatile and/or non-volatile memory (e.g., RAM and ROM) or in other storage devices and their associated storage media, which can include hard-drives, floppy-disks, optical storage, tapes, flash memory, memory sticks, digital video disks, biological storage, and other tangible, physical storage media.

Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. A machine-controlled method, comprising:
a machine estimating an expected conversion rate for each of a plurality of ads based at least in part on a first latent variable by applying an estimated conversion rate statistical model to each of the plurality of ads;
the machine estimating an expected average order value (AOV) for each of the plurality of ads based at least in part on a second latent variable by applying an estimated AOV statistical model to each of the plurality of ads;
the machine applying a first inference algorithm to determine a most likely value for the first latent variable based at least in part on observed data corresponding to the ads;
the machine applying a second inference algorithm to determine a most likely value for the second latent variable based at least in part on the observed data corresponding to the ads; and
the machine determining a plurality of auction bids based on the estimated expected conversion rate and the estimated expected AOV,
wherein determining the auction bids comprises applying the following equation for each of the plurality of ads:

$$b_i = \frac{1}{T}\left(\frac{\beta_{aov} + r_i}{\alpha_{aov} - 1 + x_i}\right)\left(\frac{\alpha_{cvr} + x_i}{\beta_{cvr} + n_i}\right),$$

where $b_i$ refers to the auction bid for an individual ad i, $\alpha_{aov}$ and $\beta_{aov}$ are campaign-level parameters for the expected AOV for the ad i, $\alpha_{cvr}$ and $\beta_{cvr}$ are campaign-level parameters for the expected conversion rate for the ad i, $n_i$ refers to a total number of observed clicks for the ad i, $x_i$ refers to a total number of observed conversions for the ad i, $r_i$ refers to a total of observed revenue associated with ad i, and T refers to a spend goal for the ad i.

2. The machine-controlled method according to claim 1, wherein the observed data comprises at least one of a total number of clicks, a total number of conversions, and a total amount of revenue per conversion.

3. The machine-controlled method according to claim 1, wherein applying the estimated conversion rate statistical model to each of the plurality of ads comprises the machine retrieving the observed data.

4. The machine-controlled method according to claim 3, wherein the observed data comprises observations of random samples from a Poisson distribution.

5. The machine-controlled method according to claim 1, wherein applying the estimated AOV statistical model to each of the plurality of ads comprises the machine retrieving the observed data.

6. The machine-controlled method according to claim 1, wherein determining the auction bids is further based on an ad spend goal.

7. The machine-controlled method according to claim 1, wherein each of the plurality of auction bids corresponds to one of the plurality of ads.

8. The machine-controlled method according to claim 1, further comprising the machine outputting a portfolio of auction bids comprising at least the plurality of auction bids.

9. An apparatus, comprising:
a statistical model application module on a machine configured to apply at least two statistical models to a set of observed data corresponding to each of a plurality of ads;

an inference algorithm application module on the machine configured to apply at least one inference algorithm to the set of observed data; and a bid determination module on the machine configured to determine a portfolio of auction bids based on at least first output data received from the statistical model application module and second output data received from the inference algorithm application module, wherein determining the portfolio of auction bids comprises applying the following equation for each of the plurality of ads:

$$b_i = \frac{1}{T}\left(\frac{\beta_{aov} + r_i}{\alpha_{aov} - 1 + x_i}\right)\left(\frac{\alpha_{cvr} + x_i}{\beta_{cvr} + n_i}\right),$$

where $b_i$ refers to the auction bid for an individual ad i, $\alpha_{aov}$ and $\beta_{aov}$ are campaign-level parameters for the expected average order value (AOV) for the ad i, $\alpha_{cvr}$ and $\beta_{cvr}$ are campaign-level parameters for the expected conversion rate for the ad i, $n_i$ refers to a total number of observed clicks for the ad i, $x_i$ refers to a total number of observed conversions for the ad i, $r_1$ refers to a total of observed revenue associated with ad i, and T refers to a spend goal for the ad i.

10. The apparatus according to claim 9, wherein the at least two statistical models comprise an expected conversion rate statistical model.

11. The apparatus according to claim 9, wherein the at least two statistical models comprise an expected average order value (AOV) statistical model.

12. The apparatus according to claim 9, wherein the first output data comprises an estimated conversion rate for each of the plurality of ads.

13. The apparatus according to claim 9, wherein the first output data comprises an estimated average order value (AOV) for each of the plurality of ads.

14. The apparatus according to claim 9, wherein the portfolio of bids comprises a determined bid for each of the plurality of ads.

15. The apparatus according to claim 12, wherein the inference algorithm application module configured is further configured to refine the estimated conversion rate for at least one of the plurality of ads.

16. The apparatus according to claim 13, wherein the inference algorithm application module configured is further configured to refine the estimated AOV for at least one of the plurality of ads.

17. The apparatus according to claim 9, further comprising an observed data retrieval module on the machine configured to retrieve the set of observed data corresponding to each of the plurality of ads.

* * * * *